United States Patent [19]

Nakahashi et al.

[11] Patent Number: 4,931,227

[45] Date of Patent: Jun. 5, 1990

[54] MOLDING OF LIGHT REFLECTOR

[75] Inventors: Sumio Nakahashi, Saijo; Fumihiko Miyamae, Shuso; Nobuki Seike, Niihama, all of Japan

[73] Assignee: Nissen Chemical Industry Co., Ltd., Niihama, Japan

[21] Appl. No.: 258,141

[22] Filed: Oct. 14, 1988

Related U.S. Application Data

[62] Division of Ser. No. 67,939, Jun. 29, 1987, Pat. No. 4,830,899.

[30] Foreign Application Priority Data

| | | | |
|---|---|---|---|
| Jul. 4, 1986 | [JP] | Japan | 61-158473 |
| Nov. 6, 1986 | [JP] | Japan | 61-265284 |
| Apr. 3, 1987 | [JP] | Japan | 62-51157 |

[51] Int. Cl.[5] ........ B29D 11/00; B29C 39/02; B29C 39/10

[52] U.S. Cl. ........ 264/1.9; 249/183; 264/1.1; 264/230; 264/241; 264/313; 264/334

[58] Field of Search ........ 264/1.1, 1.3, 1.9, 2.5, 264/221, 334, DIG. 44, 230, 241, 313; 249/183

[56] References Cited

U.S. PATENT DOCUMENTS

| | | | |
|---|---|---|---|
| 2,154,639 | 4/1939 | Rohm et al. | 264/334 |
| 3,245,316 | 4/1966 | Janetos et al. | 264/1.3 |
| 3,306,956 | 2/1967 | Barnette | 264/1.9 |
| 3,980,747 | 9/1976 | Nakagawa et al. | 264/227 |
| 4,552,716 | 11/1985 | Habich | 264/334 |

*Primary Examiner*—James Lowe

*Attorney, Agent, or Firm*—Cohen, Pontani & Lieberman

[57] ABSTRACT

A light reflection material comprises transparent body of organic glass having therein a thin through hole or holes whose inner wall is smooth. This material is useful for an ornamental material, a lighting material, eye-obstructing material, shading material, etc.

This material is manufactured by pouring a raw material into a mold within which a thread or threads of synthetic fiber are straightly or curvedly set according to aimed pattern and pulling the thread or threads out of the formed body to form a thin hole or holes or pulling the thread or threads to separate them from the inner wall of the hole or holes. As a result of it, a hole or holes of a shape and number corresponding to those of the thread or threads are formed in the formed body.

4 Claims, 5 Drawing Sheets

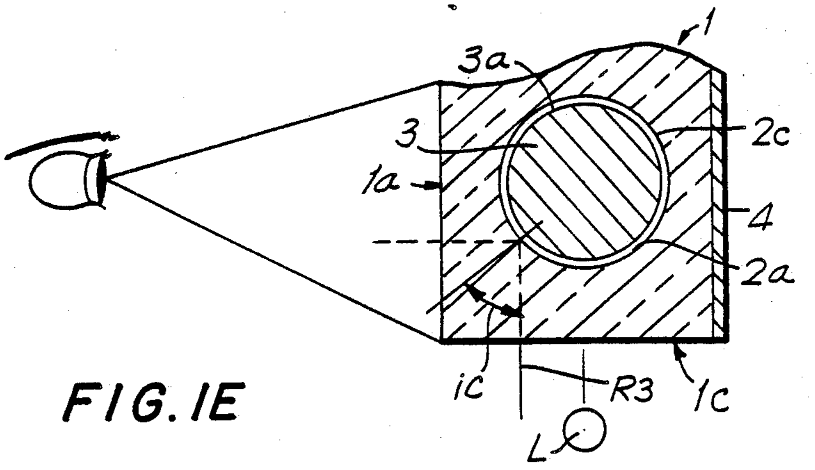
FIG. 1E
FIG. 2
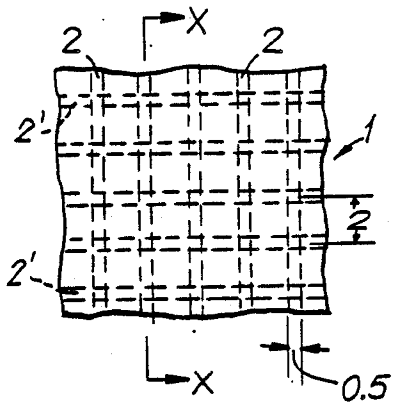
FIG. 3
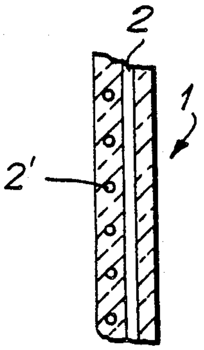

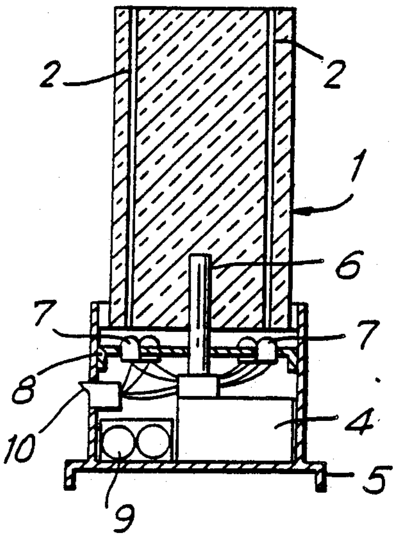
FIG. 4
FIG. 5
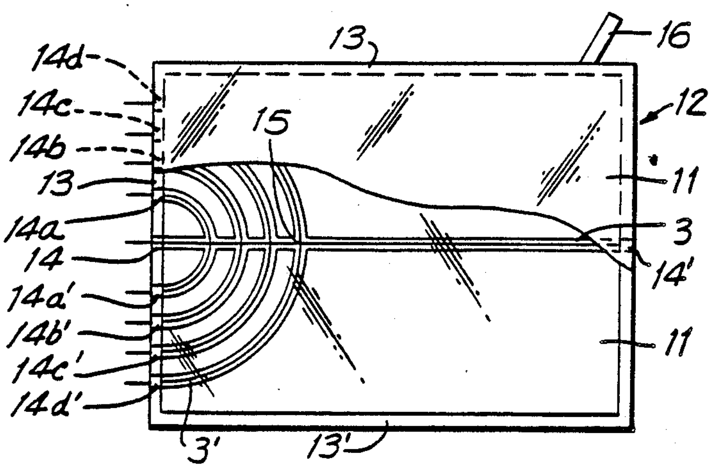

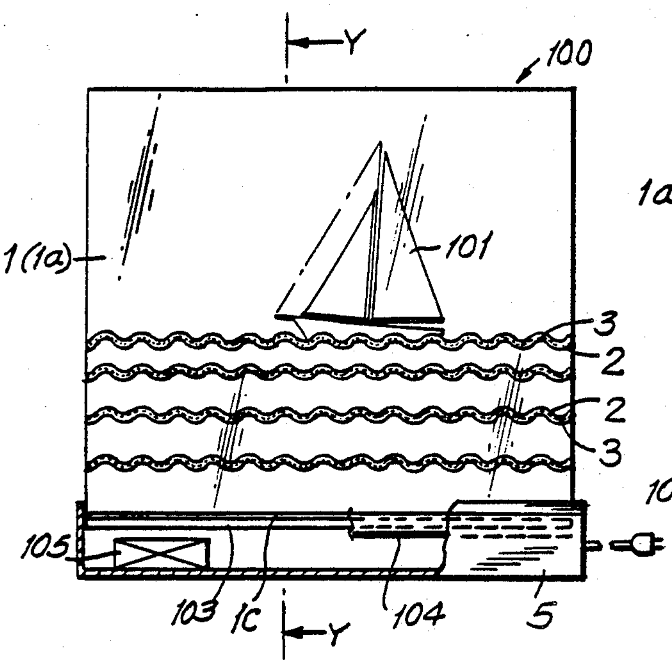
FIG. 8
FIG. 9
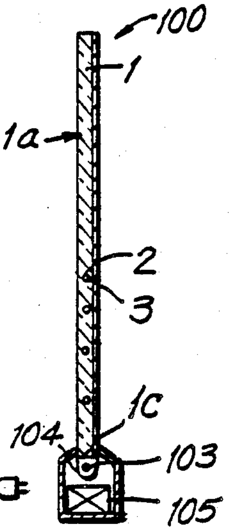
FIG. 10
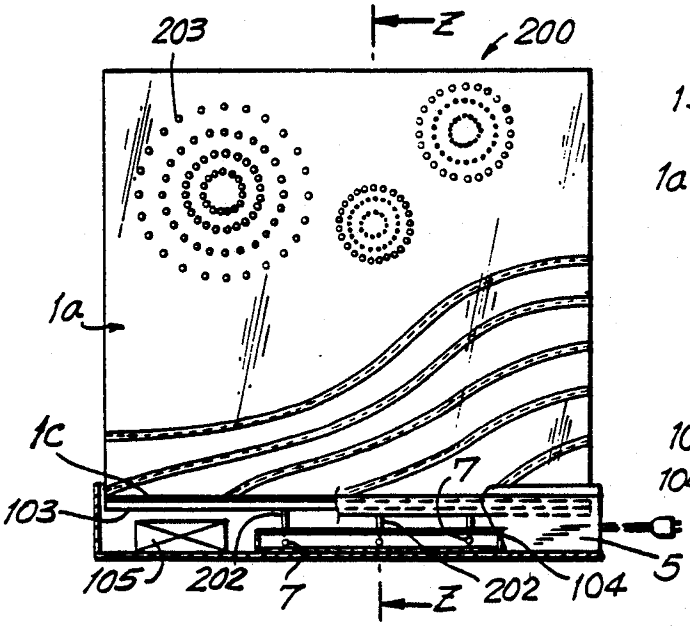
FIG. 11
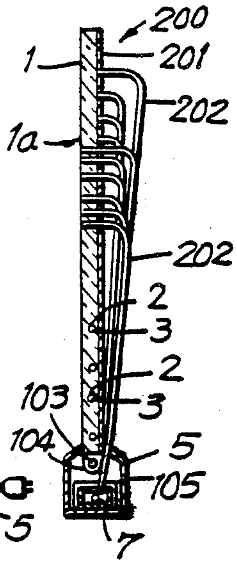

MOLDING OF LIGHT REFLECTOR

This is a division of application Ser. No. 067,939 filed June 29, 1987 now U.S. Pat. No. 4,830,899.

BACKGROUND OF THE INVENTION

1. Field of the Invention

This invention relates to a light reflection material useful for an ornamental material, an illumination material, a shading material, an eye-obstructing material, etc. and a method of manufacturing it.

2. Description of the Prior Art

Polymethylmethacrylate is superior to glass in permeability to visible light and impact resistance by ten and more times and half as heavy as glass and has excellent weathering resistance. Furthermore, its surface nowadays can be made as hard as glass because the surface hardening technique has improved. So, it is widely applied to, for example, signboards, displays, light reflection materials, translucent building materials, light reflection apparatus, windshields of airplanes or motorcycles, windows of various vehicles, instrument covers, watching tanks, greenhouses, lenses, accessories, specimens, etc.

In these few years, the edge-lighting technology improved and new light sources have been replacing fluorescent lights. Light reflection materials used for the edge-lighting usually comprises an acrylic resin plate with V-grooves on the surface. We believe that a plate with a thin through hole or holes as a light reflection material is not yet known.

SUMMARY OF THE INVENTION

It is an object of this invention to provide a new light reflection material which is excellent for use in ornamental signboards, displays, ornaments, shading material, and eye-obstructing materials, etc. for obtaining a three dimensional effect, as well as for use in a thin illumination material which employs edge-lighting.

To achieve the above-mentioned object, the present invention provides a light reflection material comprising a transparent body made of an organic glass having one or more thin through holes penetrating said body which thin through holes have smooth inner walls.

Further the present invention provides a method for manufacture of the above light reflection material comprising setting a thread within a mold, pouring a liquid organic glass material into said mold, polymerizing and hardening it at a temperature higher than the temperature at which the thread undergoes thermal shrinkage, taking the polymerized and hardened organic glass from the mold, and then pulling out or separating the thread from the glass.

BRIEF DESCRIPTION OF THE DRAWINGS

FIG. 2 is a partial front view of a plate-like light reflection material according to this invention.

FIG. 3 is a cross-sectional view taken along line X—X of FIG. 2.

FIG. 4 is a cutaway view of an ornament (mobile) which is one of the applications of the material of this invention.

FIG. 5 is a cutaway view of one of the manufacturing steps of this invention showing a mold within which threads are equipped.

FIG. 8 is a front view, with portions broken away for clarity, of another example of this invention.

FIG. 9 is a cross-sectional view taken along line Y—Y of FIG. 8.

FIG. 10 is a front view, with portions broken away for clarity, of a furthermore other example of this invention.

FIG. 11 is a cross-sectional view taken along line Z—Z of FIG. 11.

DESCRIPTION OF THE PREFERRED EMBODIMENT

Material

Figure 1A:
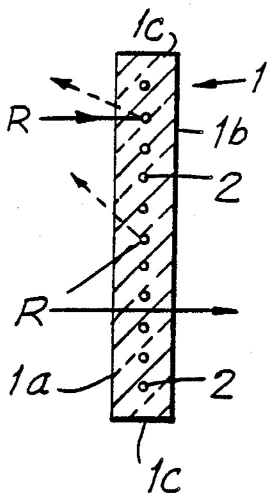
FIG. 1 A, B, C, D and E are side views of models showing the construction and action of a light reflection material according to this invention.
Figure 1B:
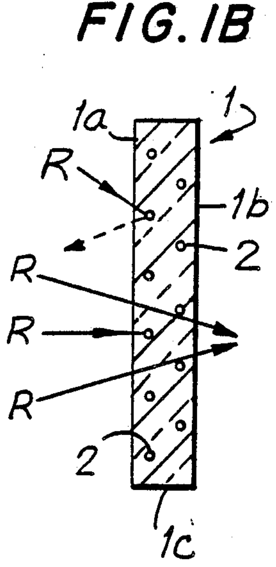
Figure 1C:
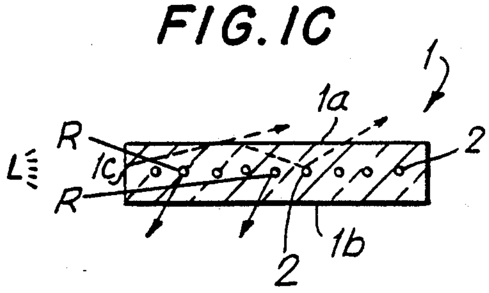
Figure 1D:
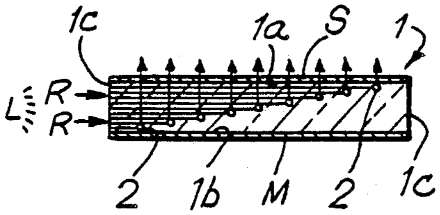

As organic glass materials of the present invention, any block-polymerized transparent resins such as urea resins and unsaturated polyester resins are usable besides methacryl resins, but acryl resins, especially polymethyl methacrylate are most preferred in the aspect of the object of the present invention. Urea resins and unsaturated polyester resins are economical but unsuitable for ornamental use because of their lower permeability to visible light and further they are inferior in weathering resistance to polymethyl methacrylate.

Construction

The light reflection material according to this invention is characterized by having a thin through hole or holes with smooth inner wall but whose entrance and exit position and route are not restricted. The inside diameter of the hole, limited by the holing-method described below, is usually 0.1-2 mm, but preferred diameter is 0.5-1.5 mm. The crosssectional shape of the hole is usually circular, but elliptical, square or rectangular are acceptable.

For total reflection of light from all directions, the most desirable cross-sectional shape of the hole is circular, but if a complex light reflection effect is desired, a hole having a spiral configuration or having a square or rectangular cross-sectional shape may be available.

The number and the direction of the through holes can be determined at will according to the purpose. For the purpose of edge-lighting which is most widely applied, it is desirable that plurality a of the through holes run in parallel along the direction of the surface through the plate-like material. Especially, when using this as a surface light source, it is ideal to densely arrange the holes with different distances respectively from the surface of the plate. However, for the purpose of ornament, it is preferred that various ornamental designs are formed by the combination of holes of various path shape such as arc, wave, spiral, etc. besides straight line. Although concrete figures or picturesque designs are hard to make by the manufacturing method now available, various designs like running water, combined zigzags, spiral and horizontal belt, can be formed. If the distance between holes is 5-10 mm or less, the plate can hardly be seen through from the direction of the surface. Therefore, the product of this type is useful for a shading material or unidirectionally transparent windowpane, etc.

The hole is usually empty, but the thread used for holing may remain in the hole if desired. However, the surface of the thread enclosed must not be in contact with the inner wall of the through hole when all of the inner walls of the holes are desired to be utilized for light reflection. When the cross section of the hole is not circular, the thread in the hole may be seen depending on the direction of the incident ray. Thus, by utilizing this phenomenon, that is, by making a colored thread in the non-circular hole visible, so more ornamental effects can be obtained. If the hole has a circular cross-sectional shape but the thread in the hole is closely in contact with the inner wall of the hole, the total reflection from the inner wall will not occur because the refractive indexes of the light reflection material and the thread are similar. So that if the thread partially separates from the inner wall of the hole, a part of the thread can be seen and the rest can not be seen. It means that the ornament effect increases.

The inner wall of the hole can be colored with various kinds of pigments, dyes or paints. The hole colored with transparent fluorescent pigments or pearl paints especially beautifully fluoresces or gives pearl-like luster to increase the ornament effect of the product. If opaque paints are used, a light reflection material having solid colored holes can be obtained.

The shape of the material according to this invention can be determined at will. Various shapes such as plate, disk, cylinder, prism, pyramid, cone and the like are available by cast molding and post-processing according to the purpose. The most preferred shape is plate because it can be most widely applied.

Manufacture

A new light reflection material according to this invention may be manufactured by inserting one or more threads into a mold with a resin material the threads being desirably non-adhesive and inert to the resin material, the threads being placed material resin in straight or non-straight form (e.g. in arc-shape or wave-shape) into the mold considering relaxation (when a non-drawn thread is used) and shrinkage (when a drawn thread is used) which occurs by polymerization under heating of the material, fixing the both ends of the thread to the mold, pouring a liquid organic glass material into the mold, polymerizing the material at a higher temperature than the temperature at which the thread undergoes thermal deformation, taking the hardened resultant material out of the mold, and pulling out the thread or peeling the thread from the inner wall of shaped hole. In short, after preparing a (concave) mold suitable for manufacturing a product of desired shape and arranging in the mold the thread of desired fineness and number of fibers and in the desired direction, and/or curvature, the suitable resin material is poured into the cavity of the mold. In manufacturing a plate product which is the preferred embodiment of this invention, plane or bent polished plate glass is usually used as a mold. In this case, after setting two plate glasses in parallel and sealing the circumferential gap with a sealing material such as plasticized polyvinyl chloride, a suitable material is poured into the cavity. So, if the material which composes the product is polymethylmethacrylate, the material before hardening is a mixture (syrup) made by adding a polymerization catalyzer such as benzoyl peroxide or azobisisobutyronitrile to a viscous liquid made by polymerizing methyl methacrylate at low conversion or dissolving said polymer into monomer. This syrup is gently poured into the gap after pre-vacuumdeaeration, and then heated stepwise. And after polymerization up to 90%, the resultant is heated for 1–2 hours at a temperature of 110°–120 ° C. to be completely polymerized and to be annealed. In this procedure, an autoclave may be used to restrain foaming. Because vaporized monomer and its decomposed gas generated by rapid polymerization and existence of residual stress in the product decrease the quality of the product, it is necessary to carefully restrained said gas generation and gradual cooling of the product after heating. When the thread is pulled out after hardening of the polymer, the thread comes off with a slight necking according to the kind of the thread, the track makes a hole of an inner diameter according to the diameter of the thread which goes through the product. The thread used for this procedure may be a monofilament, yarn or slit yarn obtained by ripping a film or sheet. To form a straight hole, a drawn thread is desirable. According to the findings obtained by the inventors, even a normally drawn thread moderately shrinks at a polymerization temperature of the resin material to be poured and during polymerization, so that the thread gives a straight line and the drawn threads of polypropylene, high density polyethylene, poylamide or polyester are suitable for forming a straight hole.

When non-straight holes are desired the thread is not always required to be a drawn thread. In some cases, curve or meanders caused by thermal relaxation or thermal shrinkage of the non-drawn thread may rather form interesting abstract designs. The necking phenomenon striking in non-drawn threads is useful for pulling the thread out of curved portion of large curvature of the hole because the phenomenon reduces frictional resistance. When heated in free or loose state in a monomer such as methyl methacrylate, a drawn thread shrinks by 1–4% and a non-drawn thread relaxes by 1–2%. Accordingly, considering these characteristics resulting from the thermal history of the threads to be used, a reflection material having non-straight holes of various patterns can be obtained by placing in the mold these threads so that they may curve with desired curvature in the same way as when forming straight holes. But threads placed in the mold in the curved form may go down like a catenary, so it is desirable that a support made of the same material as the polymer resin is equipped in the mold.

As described above, selection of the suitable thread is an important requirement for embodying this invention. For better selection, it is preferable to measure the shrinkage percentage of the thread in loose state which is heated in the molding monomer. When forming a straight hole, the desirable shrinkage percentage is 1–10%. If the percentage exceeds 10%, unexpected troubles such as deformation of the mold caused by excessive shrinkage of the thread in polymerizing may occur.

To summarize, the common point in the selection of the thread and the requirement for polymerization is to select a drawn or non-drawn thread having a low affinity for the resin material depending on the aimed resultant and to polymerize the monomer at a temperature sufficiently lower than the melting point of the thread.

The threads suitable for the embodiment of this invention are synthetic fibers. Inorganic fibers such as a glass fiber, carbon fiber or piano wire are not recommended because they accelerate decomposition of polymerizing materials or tightly adhere to hardened resin. Synthetic fibers (including semisynthetic fibers such as rayon) have a smooth surface because they are spun out through orifices, and they not only provide holes having an inner wall of a smooth surface which gives high reflectance but also facilitates pulling-out or peeling work of the threads after hardening.

The shape of the cross-section of the thread is usually circular, but a thread in the cross-sectional shape which is square for example slit yarn is also used. The recommended outside diameter or width of these threads is 0.1–5 mm regardless of the shape of the cross-section.

The inner wall of the hole thus obtained is almost smooth without any post-processing and said hole will totally reflect a light which enters into the interface between the hole and the circumferential organic glass without any diffused reflection.

The inner wall of the hole may be colored if necessary. Recommended colorant is transparent one such as clear lacquer, but fluorescent dye, pigment, or pearl lacquer may be used together. The coloring is performed by spraying or sucking pigment solution or paint.

Action

The action of the light reflection material according to this invention is as follows.

Referring to FIG. 1, a ray(R) incident from the front (1*a*) of the product (1) is totally reflected by the inner wall of the holes (2) to prevent seeing through (FIG. 1-A). Especially, if the holes are formed in two or more lines and placed alternately, as shown in FIG. 1-B, the product substantially becomes unidirectionally transparent, so this product is suitable for a windowpane. Alternatively, a ray (R) incident through the edge (1C) from a light source (L) is totally reflected by holes (2) and radiates to the front surface (1*a*) and the rear surface (1*b*), as shown in FIG. 1-C. It is natural that the color of the radiated light is changed by the color of the light source, so that very beautiful ornament effect can be obtained by a using multicolor light source such as LED.

Furthermore, as shown in FIG. 1-D if a mirror (M) is equipped on the rear surface (the lower surface) (1*b*) of the plate (1) and the arrangement (height) of the holes (2, 2, . . . ) along the direction of the thickness is changed, a ray (R) incident through the edge (1C) hits the holes (2) one after another and is reflected to the front surface (1*a*). The ray (R) reflecting to the lower surface (1*b*) is also re-reflected to the front surface (1*a*). After all, in these manners, almost incident rays are evenly reflected to the front surface (1*a*). Accordingly, this material is useful as a surface luminescence or surface lighting means utilizing edge-lighting, for example for observation of X ray or positive color films and tracing of original drawings or pictures. It is desirable to equip a light-scattering layer (S) such as an opal glass or a ground glass which also serves for protection of the surface of the plate (1).

Furthermore, as shown in FIG. 1-E, if a thread (3) is present in the hole (2) but there is a small clearance between the inner wall (2*a*) of the hole (2*c*) and the outer surface (3*a*) of the thread, total reflection also occurs as in the case that the inside of the hole is empty because of existence of the air within said clearance. However, if the hole (2) has other shapes of square, rectangle or ellipsoidal, a part of the ray passes through the hole instead of complete total reflection, and the thread in the hole can be seen. Accordingly, if the thread is colored, the color of the thread mixes with the light of the total reflection of the hole according to the visual angle to provide a superb outlook.

Example 1

FIG. 2 is a partial front view of a plate-like light reflection material according to this invention. FIG. 3 is a cross-sectional view taken along line X—X of FIG. 2.

This embodiment (1) is made of polymethyl methacrylate and has many thin holes (2, 2 . . . , 2′, 2′. . . ) which have about 0.5 mm inner diameter and circular cross sectional shape equipped in parallel both in the directions of length and width at a distance of 2 mm.

Although this product permits scattered light to pass through, it reduces the quantity of the direct ray passing through by half and produces little dew because its thermal conductivity is by far lower than inorganic glass. Using this product, high-quality heat shading glass or unidirectional transparent glass can be made.

Example 2

FIG. 4 is a cutaway view of an ornament (mobile) which is one of the applications of the material of this invention.

A light reflection material (1) of this embodiment is a cylinder made of polymethyl methacrylate and comprising many holes (2, 2 . . . ) circularly equipped along the direction of the axis.

A worm-geared reduction motor (4) to slowly rotate the cylinder (1) through a shaft (6) is fixed within a pedestal (5) in the lower part.

Many multicolored light emitting diodes (LED's) (7, 7 . . . ) are circularly equipped on a disk (8) fixed within the pedestal (5) along the trace of the holes (2).

In operation, rotate the motor (4) and at the same time emit the LED's (7). Then, the color of the cylinder (1) changes moment by moment and it looks like various colors according to the visual angle to create a fantastic impression. In FIG. 4, (9) shown a battery and (10) shows a switch.

Example 3

100 parts by weight of methyl methacrylate was put into a pre-polymerlzation vessel with 0.2 parts by weight of additives such as a catalyst etc. and then pre-polymerized for one hour at 65° C. followed by deaeration by suction at about 30 mm Hg.

Next, a mold was prepared by placing two washed and dried glass plates so that they are facing each other with a clearance which was circumferentially sealed with a gasket made of polyvinyl chloride.

Plural pairs of holes were formed in opposing each gasket at 5 mm intervals, and then drawn polyamide monofilaments of 0.9 mm diameter were stretched between the opposed gaskets and then fixed to said gaskets through the above holes.

Then, the defoamed syrup was poured into the above mold at 95% of the filling rate through an inlet provided at a upperside of the gasket and thereafter the inlet was closed. Then the mold was put into a preliminary heating vessel at 65° C. and heated for 15 minutes in order to turn out the remaining air in said polymer, and the mold was transferred to a polymerization vessel and was heated at 60° C. for 4 hours and then gradually the temperature was raised up to 80° C. and the mold was to stand for 20 minutes at the same temperature followed by the reaction at 120° C. for 2 hours. After the reaction was completed, the mold was gradually cooled to 40° C. and then the mold was taken apart to pieces to get a hardened organic glass plate. From the plate thus obtained, the polyamide monofilaments were pulled away, and then after the marginal portion had been cut away from the obtained plate the edges were polished under water cooling to give the desired product having thin through holes.

An experiment similar to the example described above was performed with threads of different kind and thickness. The results are shown in the following Table 1.

TABLE 1

| Thread | | | | Evaluation* | | | |
|---|---|---|---|---|---|---|---|
| Kinds | Section (mm) | Drawing** | Annealing*** | Linearity | Removability | Optical property | Note |
| Polyamide filament | 0.6φ | + | | O | O | O | |
| Polyamide filament | 0.9φ | + | | O | O | O | |
| Polyamide filament | 1.5φ | + | | O | O | O | |
| Polyamide filament cord | 0.9φ × 3 | + | | O | O | O | |
| Polyethylene terephthalate slit yarn | 0.1φ × 5 | + | | Δ | Δ | O | |
| Polypropylene sheet | 0.5φ × 3 | − | + 80° C., 1 hr. | X | Δ | O | |
| Polypropylene slit yarn | 0.2φ × 4 | + | | O | O | O | |
| Polypropylene slit yarn | 0.2φ × 7.5 | + | + 140~150° C. 30 sec. | O | O | O | |
| High-density Polyethylene slit yarn | 0.3φ × 11 | − | — | X | Δ | O | |
| High-density Polyethylene slit yarn | 0.3φ × 4 | + | — | O | O | O | |
| Glass fiber | 2.0φ | | | O | X | X | Foamed, unremovable |
| Piano wire | 0.3φ | | | X | X | X | Unremovable |

*Evaluation basis: O excellent,Δgood,Xpoor.
**Drawing: + executed, − not executed.
*Annealing: + executed, − not executed 13'). In addition, holes (14***a*, 14*a'*, 14*b*, 14*b'*. . . ) are made on both sides of the hole (14) of the gasket (13) at a distance of 30 mm, and drawn monofilaments (3') are installed between the corresponding pairs of the holes (14*a*–14*a'*; 14*b*–14*b'*. . . ) so that they form concentric circles. Each crossing part (15) of the filaments (3') and the filament stretched first (3) is maintained by the filament (3).

The defoamed syrup pre-polymerized is slowly poured into the mold through the pouring hole (16) made on the gasket (13). Pouring is stopped when the syrup is filled up to 95% of the capacity of the mold and the pouring hole is sealed.

Example 5

Figure 6:
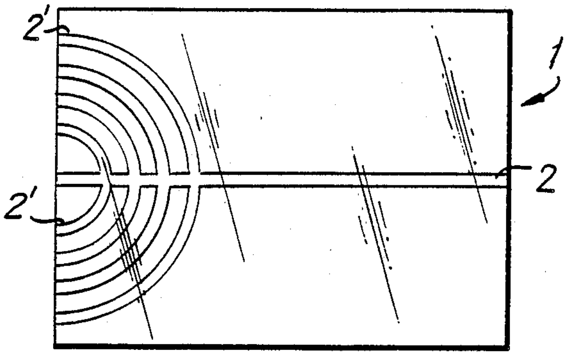
FIG. 6 is a plan view of a light reflection material formed with the mold of FIG. 5.

FIG. 5 is a cutaway view of a shaping mold within which threads are equipped as an example of the manufacturing means according to the present invention. FIG. 6 is a plan view of a light reflection material shaped by the mold of FIG. 5.

100 parts by weight of methylmethacrylate was put into a pre-polymerization vessel with 0.2 part by weight of additives such as catalyst etc. and then pre-polymerized for one hour at 65° C. followed by deaeration by suction at about 30 mm Hg.

Next, a mold 12 was prepared by placing two washed and dried glass plates 11, 11 so that they are facing each other with 15 mm clearance which was circumferentially sealed with a gaseket made of polyvinyl chloride.

A pair of holes (14, 14') are made on each center of a pair of gaskets (13, 13') at the opposite sides of the mold (12) and drawn monofilaments (3) of polyamide of 0.9 mm diameter are stretched through each pair of holes which face to each other and fixed to the gasket (13,

The mold is put into a pre-heating tank at a temperature of 95° C. and heated for about 15 minutes to remove remaining air form the polymer, then it is transferred to a polymerizing tank and heated for four hours at 60° C. The temperature is gradually raised up to 80° C., and it is allowed to stand for 20 minutes and then heated for two hours at 120° C. After the polymerization is over, the material is cooled to 40° C. and the mold is taken apart to pieces and a hardened organic plate glass is took out, the polyamide filaments (3, 3') are pulled out, the edge part is cut out, and the surface is polished while cooling with water to obtain a plate-like light reflection material (1) having straight and arched holes shown in FIG. 6.

The material (1) offers beautiful outlook due to the straight and arched holes (2 and 2') formed in the organic plate glass.

Example 6

Figure 7:
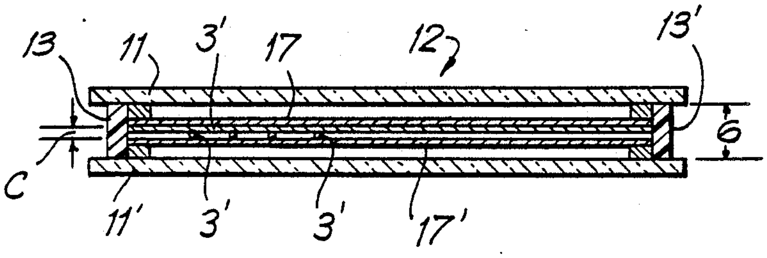
FIG. 7 is a fragmentary cross-sectional view of a mold for manufacturing another embodiment of this invention.

FIG. 7 is a fragmentary corss-sectional view of a mold for manufacturing another example of this invention.

The mold (12) comprises two plate glasses (11, 11') set in parallel at a distance of 6 mm between which two plates of polymethyl methacrylates (17, 17') of 1.5 mm thick are set in parallel with a gap of 1.2 mm (c), and arched monofilaments (3') of 1 mm diameter set within the gap, in the same manner as embodiment 5 but without the thread (3) in Example 5.

The outlook of an organic plate glass produced with this mold is the same as that of FIG. 3 except that there is no straight hole, and the plates of polymethyl methacrylate (17, 17') in the mold are integrated with the poured resin material to form a plate material of 6 mm thick. In addition, the monofilaments (3') are fixed with the plate (17, 17'), so the arched shape of the threads is exactly maintained.

Example 7

FIG. 8 is a front view, with portions broken away for clarity, of an example of this invention. FIG. 9 is a cross-sectional view taken along line Y—Y of FIG. 8.

The entirety (100) comprises a square reflection material (1) made of polymethyl methacrylate having plurality of wavelike through holes 2, 2 . . . therein and threads 3, 3 . . . provided in the holes separately from the inner wall of the holes, a picture of a yacht (101) printed with fluorescent paint on the rear surface of the plate (1), a half mirror (102) equipped on the rear of the plate (1), a cold cathode fluorescent tube (103) equipped on the lower surface 1 *c* of the plate (1), a reflecting plate (104) of the tube (103), a power source (105) of the tube, and a casing and pedestal (5).

In operation, when electric power is supplied, the plurality of wavelike through holes (2, 2 . . . ) brightly shine and the sail of the white yacht painted is picked out to offer a fantastic outlook.

Example 8

FIG. 10 is a front view, with portions broken away for clarity, of another example of this invention. FIG. 11 is a cross-sectional view taken along line Z—Z of FIG. 10.

As in Example 7, the entirety (200) comprises a square reflection material (1) made of polymethyl methacrylate having therein plurality of curved through holes (2, 2 . . . ) in the form of water stream and threads (3, 3 . . . ) which is colored with blue fluorescent dye and provided in the holes separately from the inner wall of the holes, a black poly vinyl chloride plate (201) equipped on the rear of the plate (1), a cold cathode fluorescent tube (103) equipped on the lower surface (1*c*) of the plate (1), a reflecting plate (104) of the tube (103), a power source (105) of the tube, and a casing and pedestal (5). This embodiment futher comprises many optical fibers (202, 202 . . . ) passing through the plate (1) in the direction of the thickness and whose tops appear to the front (1*a*) of the plate (1) in the shape of fireworks and whose ends are collected and reach the casing (5), and high-brightness red LED's (7, 7 . . . ) equipped at the end of the optical fibers In operation, when the tube (103) and the LED's (7) light, the plurality of wavelike through holes (2, 2 . . . ) in the form of stream bright blue-white and at the same time the light of the LED's transmitting through the optical fibers (202) become light spots (203, 203 . . . ) in the form of fireworks at the tops of the optical fibers and decorate the plate to offer extremely beautiful outlook. Especially, if the light spots corresponding to each firework are flashed on and off in turn or lit by turns beginning with the center of each firework, the feeling of seeing the real fireworks is given. If necessary, LED's of other colors may be used.

What is claim is:

1. A method for manufacture of a light reflection material comprising a transparent body made of an organic glass having one or more thin through holes penetrating said body and being smooth on inner walls thereof, which method comprises setting a synthetic thread within a mold, pouring a liquid organic glass material into said mold, polymerizing and hardening the liquid organic glass material at a temperature higher than the temperature at which the thread undergoes thermal deformation, and at a temperature lower than the melting point of said thread, taking the polymerized and hardened organic glass from the mold, and then pulling out or separating the thread from the glass.

2. The method for manufacture of the light reflection material according to claim 1, wherein a drawn or non-drawn thread of low affinity for the organic glass material is used.

3. The method for manufacture of the light reflection material according to claim 2, wherein the thread is a synthetic fiber.

4. The method for manufacture of the light reflection material according to claim 1, wherein the cross section of the through holes are approximately circular, ellipsoidal, square or rectangular.

* * * * *